US008260866B2

(12) United States Patent
Kobayashi et al.

(10) Patent No.: US 8,260,866 B2
(45) Date of Patent: Sep. 4, 2012

(54) IMAGE TRANSMISSION SYSTEM FOR TRANSMITTING IMAGE DATA TO REGISTERED USERS

(75) Inventors: Minako Kobayashi, Ikeda (JP);
Hirohisa Miyamoto, Kobe (JP);
Takehisa Yamaguchi, Ikoma (JP);
Katsuhiko Akita, Amagasaki (JP);
Okihisa Yoshida, Amagasaki (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 253 days.

(21) Appl. No.: 12/252,490

(22) Filed: Oct. 16, 2008

(65) Prior Publication Data

US 2009/0113010 A1    Apr. 30, 2009

(30) Foreign Application Priority Data

Oct. 31, 2007   (JP) .................................. 2007-283271

(51) Int. Cl.
*G06F 15/16* (2006.01)
*G06F 3/12* (2006.01)
(52) U.S. Cl. ...................................... 709/206; 358/1.15
(58) Field of Classification Search .......... 709/204–207, 709/223–229
See application file for complete search history.

(56) References Cited

U.S. PATENT DOCUMENTS

| | | | | |
|---|---|---|---|---|
| 7,003,546 B1* | 2/2006 | Cheah | ............................ | 709/200 |
| 7,092,945 B2* | 8/2006 | Hall et al. | ...................... | 707/770 |
| 7,243,126 B2* | 7/2007 | Sasaki et al. | ................... | 709/206 |
| 2002/0016857 A1* | 2/2002 | Harari | ............................ | 709/238 |
| 2002/0049751 A1* | 4/2002 | Chen et al. | ......................... | 707/3 |
| 2004/0021889 A1* | 2/2004 | McAfee et al. | ............... | 358/1.13 |
| 2005/0125466 A1* | 6/2005 | Tsujimoto | ...................... | 707/204 |
| 2005/0219227 A1* | 10/2005 | Yamahata et al. | ............. | 345/173 |
| 2006/0044621 A1* | 3/2006 | Ohhata et al. | .................. | 358/438 |
| 2006/0099947 A1* | 5/2006 | Shozaki et al. | ............. | 455/435.1 |
| 2006/0140376 A1* | 6/2006 | Yoshioka | ................. | 379/210.01 |
| 2006/0274358 A1* | 12/2006 | Fukui et al. | ................... | 358/1.15 |
| 2007/0011410 A1* | 1/2007 | Fukui et al. | .................... | 711/154 |

(Continued)

FOREIGN PATENT DOCUMENTS

JP          2003-108479 A       4/2003

(Continued)

OTHER PUBLICATIONS

Japanese Office Action issued in corresponding Japanese Patent Application No. 2007-283271, dated Sep. 8, 2009, and English translation thereof.

(Continued)

*Primary Examiner* — Shirley Zhang
(74) *Attorney, Agent, or Firm* — Buchanan Ingersoll & Rooney PC

(57) ABSTRACT

Upon accepting, from a user B, a new registration of a configuration showing that the user B wishes to receive data via a FAX, a server sets a notification flag to an address book of a user A which includes an address of the user B. Upon accepting a login of the user A, an MFP displays a message to notify the user A of the new registration by the user B, based on the notification flag. The user A, who has notified of the new registration, can transmit the data to the user B with use of the new registration configured by the user B, namely via a FAX. Accordingly, the user B can receive the data via a FAX as the user B wishes.

10 Claims, 9 Drawing Sheets

U.S. PATENT DOCUMENTS

| | | | |
|---|---|---|---|
| 2007/0150678 A1* | 6/2007 | Tsukada | 711/162 |
| 2007/0189503 A1* | 8/2007 | Pearson et al. | 379/355.04 |
| 2007/0208827 A1* | 9/2007 | Fukui et al. | 709/219 |
| 2007/0214508 A1* | 9/2007 | Fukui et al. | 726/28 |
| 2007/0268906 A1* | 11/2007 | Shozaki et al. | 370/392 |
| 2008/0055659 A1* | 3/2008 | Uchida et al. | 358/400 |
| 2009/0059280 A1* | 3/2009 | Yamaguchi et al. | 358/1.15 |
| 2009/0091776 A1* | 4/2009 | Kobayashi et al. | 358/1.13 |
| 2009/0091788 A1* | 4/2009 | Yoshida et al. | 358/1.15 |
| 2009/0094254 A1* | 4/2009 | Akita et al. | 707/10 |
| 2009/0100071 A1* | 4/2009 | Kobayashi et al. | 707/10 |
| 2009/0109472 A1* | 4/2009 | Kobayashi et al. | 358/1.15 |
| 2009/0201539 A1* | 8/2009 | Sawayanagi et al. | 358/1.15 |

FOREIGN PATENT DOCUMENTS

| | | |
|---|---|---|
| JP | 2003-143383 | 5/2003 |
| JP | 2003-244308 A | 8/2003 |
| JP | 2005-033733 A | 2/2005 |
| JP | 2006-020048 | 1/2006 |
| JP | 2006-020049 A | 1/2006 |

OTHER PUBLICATIONS

Kobayashi et al., U.S. Appl. No. 12/252,480 filing date Oct. 16, 2008.

* cited by examiner

| USER NAME | ADDRESS | PROTOCOL |
|---|---|---|
| B | PC-b | SMB |
| C | 011-111-XXXX | FAX |
| D | ddd@example.com | e-mail |
| E | 011-222-XXXX | FAX |

| USER NAME | ADDRESS | PROTOCOL | REGISTRATION TIME |
|---|---|---|---|
| A | aaa@example.com | e-mail | 6/6 12:00 |
| B | 0120-345-XXXX | FAX | 6/26 14:05 |
| C | ccc@example.com | e-mail | 6/6 11:00 |
| D | 192.168.1.XXX | FTP | 5/31 11:00 |
| E | PC-E | SMB | 5/30 12:00 |

ADDRESS REGISTRATION BY USER B
14:05

LOGIN BY USER A
14:10

FIG.7
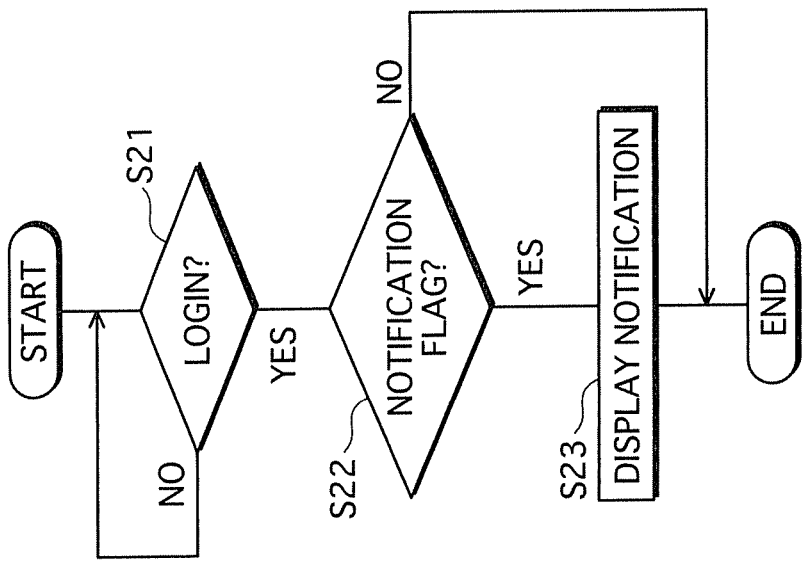
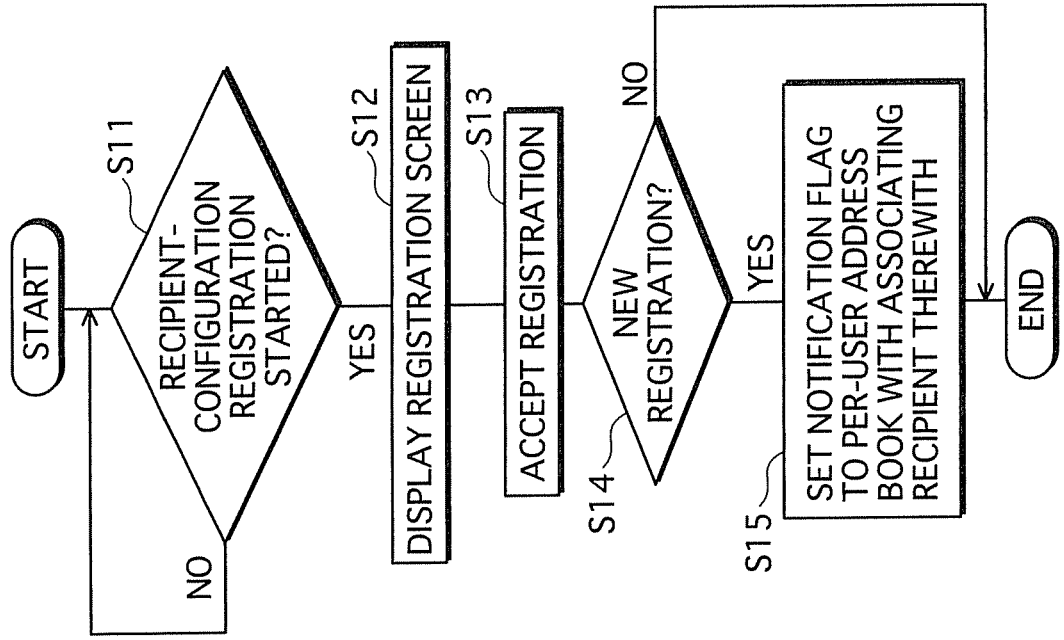

WELCOME, USER A>USE OF RECIPIENT CONFIGURATION

DO YOU USE RECIPIENT CONFIGURATION
(FAX: 012-345-XXXX) OF USER B?

72 — YES    74 — NO

IMAGE TRANSMISSION SYSTEM FOR TRANSMITTING IMAGE DATA TO REGISTERED USERS

BACKGROUND OF THE INVENTION

This application is based on application No. 2007-283271 filed in Japan, the content of which is hereby incorporated by reference.

(1) Field of the Invention

The present invention relates to selection of a destination of transmission from an image transmission apparatus, and particularly to a technique to provide assistance for operation change from an existing system.

(2) Description of the Related Art

Conventionally, when selecting a destination of transmission from an image transmission apparatus, the users use an address book prestored in the image transmission apparatus. Once a transmission destination is registered in the address book, the users can easily select the registered destination.

It is troublesome to make such destination registration for each of apparatuses. Therefore, there have been conventional techniques to improve convenience for the users. For example, a database including transmission destinations may be controlled centrally by a server such that many apparatuses share the database. Such a technique is disclosed in, for example, Japanese Laid-open Patent Application Publications No. 2003-244308, No. 2003-108479, No. 2005-33733, and No. 2006-20049.

SUMMARY OF THE INVENTION

Regarding reception of image data transmitted by the image transmission apparatus, the inventor of the present invention is considering implementing a new function for accepting registration of an option of modes for distribution of the image data, such that recipients can receive the data in a desired manner.

Conventionally, it has been common that senders of image data subjectively register destination addresses in the address book. However, with use of the stated function, the registration of the addresses is performed by the recipients without engagement of the senders.

Accordingly, even if a recipient registers a new mode for reception, a sender might not recognize it and continue to use a mode using the existing address book. As a result, the option registered by the recipient might not be used.

The present invention is made in terms of the problem stated above. The object of the present invention is to provide a technique to promote use of function that allows a recipient to receive data in a desired mode by notifying a sender, who attempts to transmit the data in an existing mode, of the mode desired by the recipient.

To fulfill the stated object, an aspect of the present invention is an image transmission system that includes a server and an image transmission apparatus as a client which are connectable to each other, the server comprising: an accepting part operable to accept registration, from a recipient, of an identifier and an address thereof; a first storage operable to store therein the identifier and the address of the recipient in a form of a recipient-address book; a second storage operable to store therein per-sender address books that each belongs to one of senders and includes identifiers and addresses of destinations; and a setting part operable to compare the identifier of the recipient with the identifiers of the destinations included in the per-sender address books, and if any of the per-sender address books include an identifier of a destination that is related to the identifier of the recipient, associate the identifier of the recipient with the any of the per-sender address books, and set a notification flag to the any of the per-sender address books to show that the registration from the recipient has been accepted, and the image transmission apparatus comprising: a login part operable to accept a login of a sender; an acquisition part operable to acquire, from the server, one of the per-sender address books that corresponds to the sender; and a notification part operable to notify the sender, of the identifier of the recipient if the notification flag has been set to the acquired per-sender address book.

To fulfill the stated object, another aspect of the present invention is an image transmission system that includes a server and an image transmission apparatus as a client which are connectable to each other, the server comprising:

an accepting part operable to accept registration, from a recipient, of an identifier and an address thereof; a first storage operable to store therein the identifier and the address of the recipient in a form of a recipient-address book; and a second storage operable to store there in per-sender address books that each belongs to one of senders and includes identifiers and addresses of destinations, and the image transmission apparatus comprising: a login part operable to accept a login of a sender; an acquisition part operable to acquire, from the server, one of the per-sender address books that corresponds to the sender; a search part operable to search the recipient-address book for an identifier of a recipient that is associated with any of identifiers included in the acquired one of the per-sender address books; and a notification part operable to notify the sender of the identifier of the recipient found by the search part.

With the stated structures, if a recipient newly registers a recipient's address that is related to an identifier included in the per-sender address book of the login user, the login user is notified of the registration. Therefore, it can be expected that the login user uses the newly registered address instead of the old address included in the per-user address book. In this way, it is possible to prompt the login user to use the recipient's new configuration.

BRIEF DESCRIPTION OF THE DRAWINGS

These and the other objects, advantages and features of the invention will become apparent from the following description thereof taken in conjunction with the accompanying drawings which illustrate a specific embodiment of the invention.

In the drawings:

FIG. 4 shows a group of tables showing an example of a data structure of a per-user address book 114;

FIG. 5 is a table showing an example of a data structure of a recipient-configuration address book 116;

FIG. 7 is a flowchart parallely showing processing performed by the server 100 and processing performed by the MFP 10;

FIG. 10 shows a menu screen 70 for determining whether to use a recipient's configuration.

DESCRIPTION OF THE PREFERRED EMBODIMENTS

First Embodiment

The following describes an image transmission system pertaining to the first embodiment of the present invention, with reference to the drawings.

<Structure>

Figure 1:
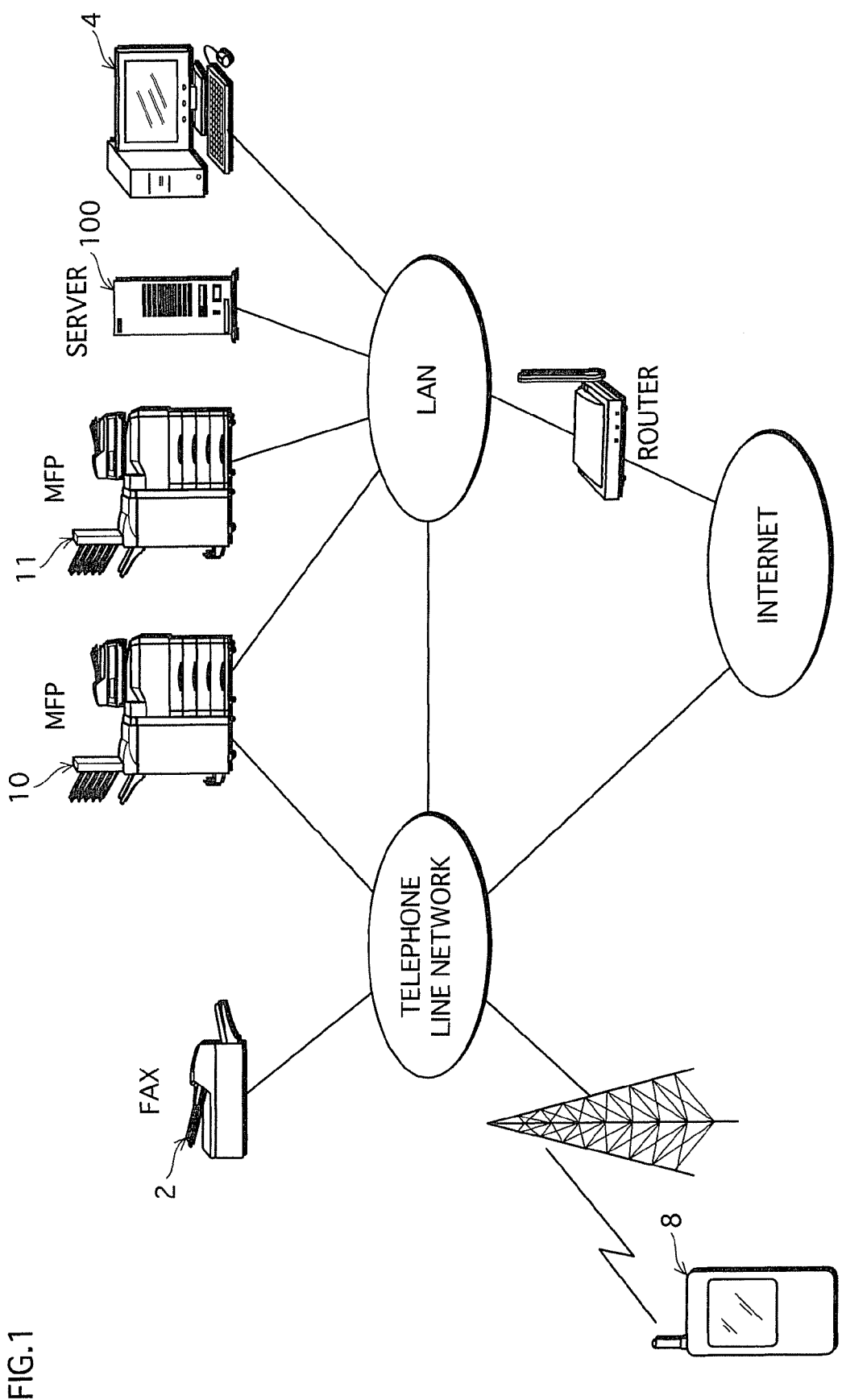
FIG. 1 shows a network structure.

As FIG. 1 shows, the image transmission system includes a FAX 2, a PC 4, a portable terminal apparatus 8, MFPs 10 and 11, and a server 100.

The portable terminal apparatus 8 has, for example, a voice call function utilized via a telephone line, an email function, and a web browser function.

The MFPs (Multi Function Peripherals) 10 and 11 are apparatuses that each has functions of a FAX, a printer, a scanner, a mailer and so on.

Figure 2:
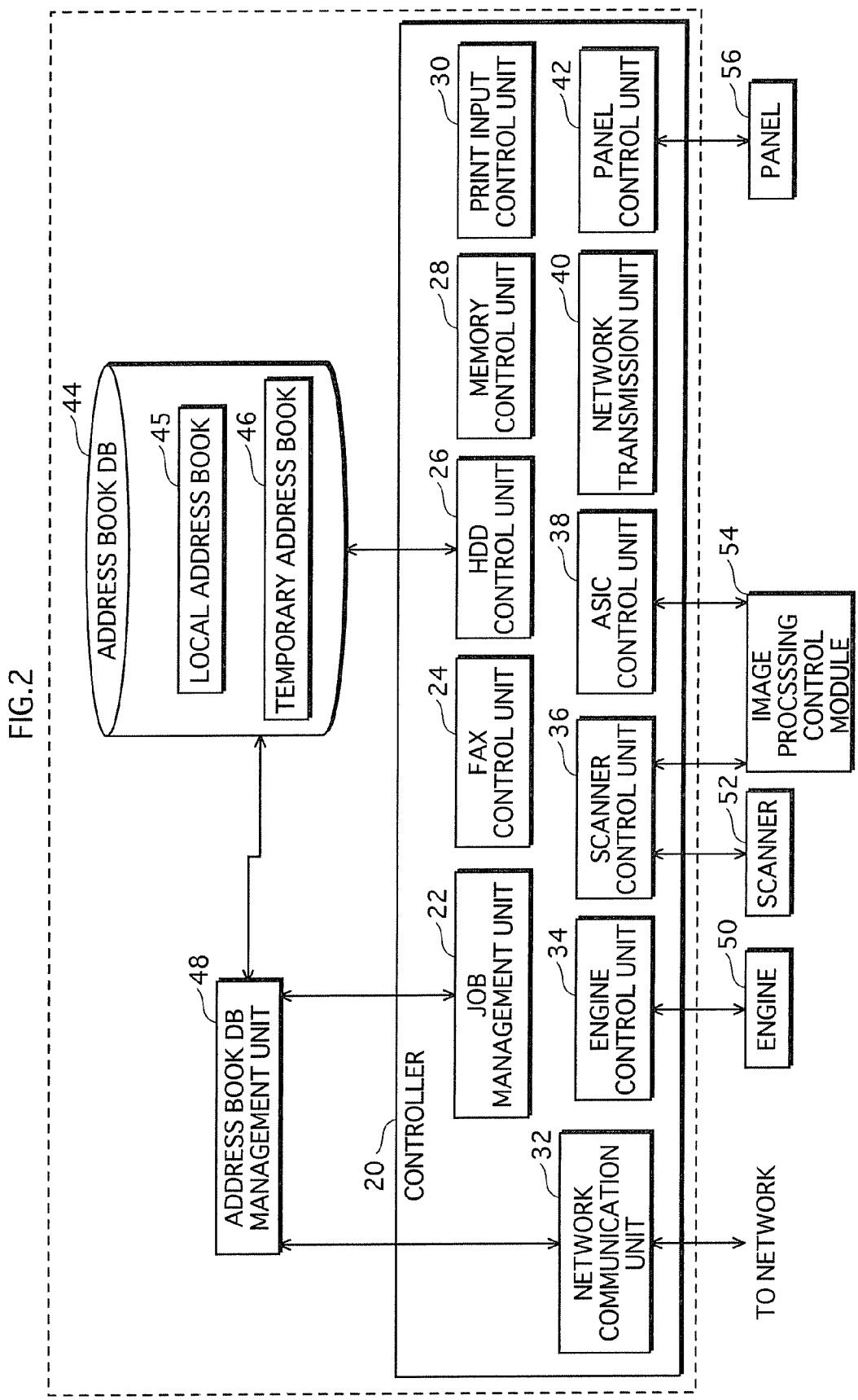
FIG. 2 shows a control block diagram of an MFP 10.

FIG. 2 shows a control block diagram of the MFP 10. The MFP 11 has the same structure as the structure of the MFP 10.

A controller 20 includes a job management unit 22, a fax control unit 24, a HDD control unit 26, a memory control unit 28, a print input control unit 30, a network communication unit 32, an engine control unit 34, a scanner control unit 36, an ASIC control unit 38, a network transmission control unit 40, and a panel control unit 42.

The job management unit 22 manages jobs relating to printing and faxing. If a job relates transmission, the job management unit 22 acquires an address from an address book DB management unit 48. The fax control unit 24 controls fax reception and transmission.

The HDD control unit 26 controls an address book DB 44 stored in a HDD (Hard Disk Drive). The memory control unit 28 controls a RAM and a ROM.

The print input control unit 30 controls an input of a print instruction. The network communication unit 32 controls network communications. The engine control unit 34 has mechanical controls of an engine 50 and so on. The scanner control unit 36 controls the scanner 52. The ASIC control unit 38 controls an ASIC (Application Specific Integrated Circuit), and also controls an image processing control module 54.

The network transmission control unit 40 controls emails and several types of protocols, such as SMB (Server Message Block), FTP (File Transfer Protocol), WebDAV (Distributed Authoring and Versioning protocol for the WWW) to transmit (distribute) data.

The panel control unit 42 displays screens and the likes on the panel 56 and accepts an input from the panel 56 which has a touch sensor. In particular, the panel control unit 42 displays a login screen to accept login of a user.

The address book DB 44 is under management by the address book DB management unit 48, and includes a local address book 45 and a temporary address book 46.

The local address book 45 is an address book locally stored in the HDD of the MFP 10. The temporary address book 46 is an address book that has been downloaded from the remote server 100.

Figure 3:
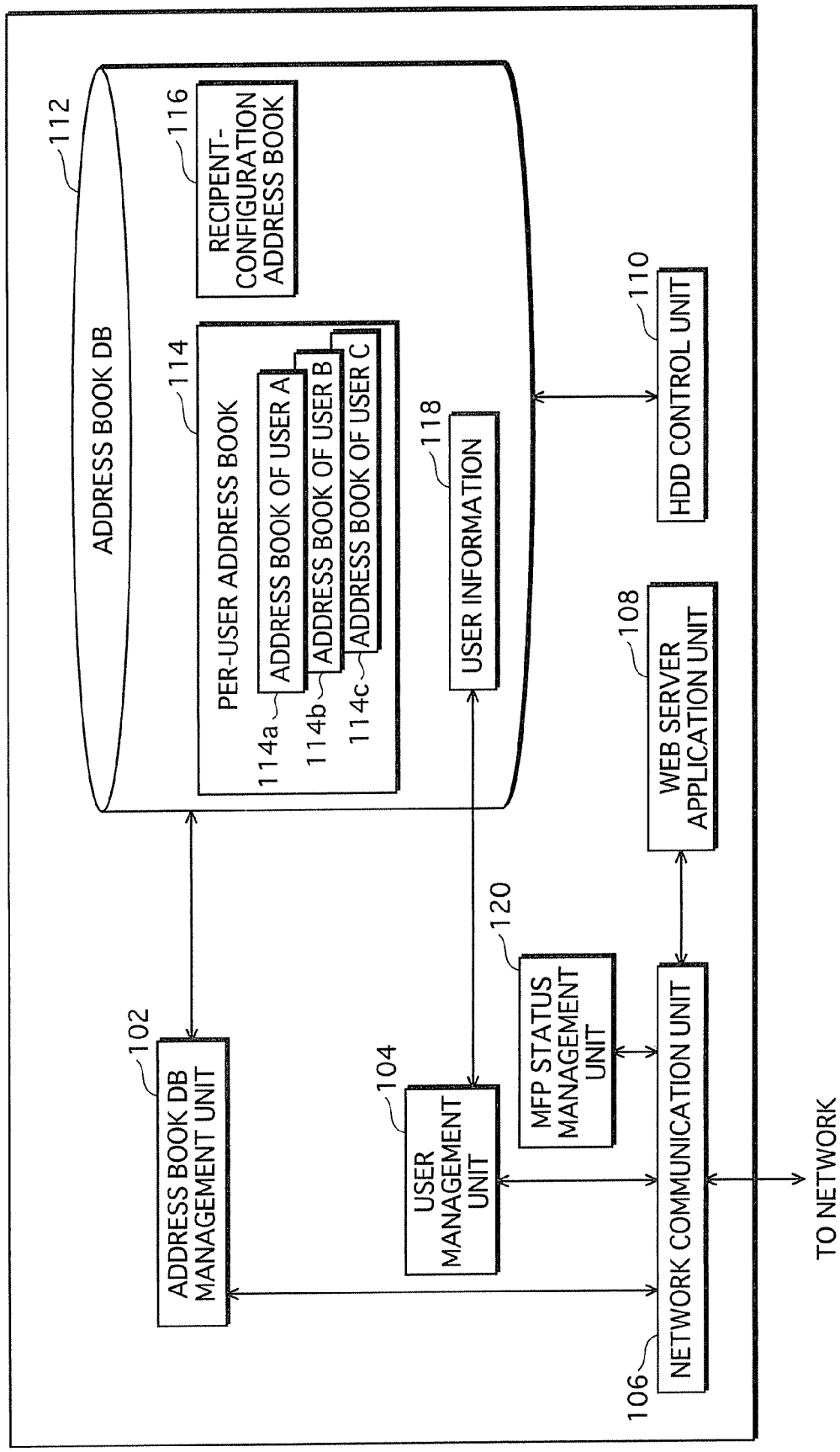
FIG. 3 shows a control block diagram of a server 100.

As the control block diagram of the server 100 of FIG. 3 shows, an address book DB management unit 102 manages an address book DB 112. A user management unit 104 manages user information 118.

A network communication unit 106 controls network communications.

A web server application unit 108 provides HTML files and so on prestored therein, in response to HTTP requests from external apparatuses. The files include components of GUI menu for registering a recipient's configuration. The web server application unit 108 accepts registration of a recipient's configuration by receiving a HTTP request.

An HDD control unit 110 controls the address book DB 112 stored in the HDD.

An MFP status management unit 120 manages statuses of use of the MFP 10 and the MFP 11 that are under control of the server 100.

The address book DB 112 includes a per-user address book 114, a recipient-configuration address book 116 and user information 118.

The per-user address book 114 includes address books 114a to 114c for users A, B and C.

Tables 115 in FIG. 4 show an example of a data structure of the per-user address book 114. The table 115 is structure from tables 115a to 115c for the users A to C. Each table includes three items, namely "name" as the transmission destination, "address" of the transmission destination, and "protocol" showing a method used for the transmission to the destination.

In this way, the address books included in the per-user address book 114 are managed for the users A, B and C as senders respectively. Therefore, the per-user address book 114 can be regarded as a "per-sender address book".

On the other hand, the recipient-configuration address book 116 is an address book in which a desired distribution mode is configured for each recipient.

A table 117 of FIG. 5 is an example of a data structure of the recipient-configuration address book 116. The table 117 includes items of "name" of a user who has registered the recipient, "address", "protocol" and "registration time".

Recipients register the configuration in the recipient-configuration address book 116 so that they can receive image data and so on in a desired mode. For example, the user B can receive image data and so on in a desired distribution mode (via FAX: 0120-345-XXXX) by having other users use the recipient's configuration.

SPECIFIC EXAMPLE

Figure 6A:
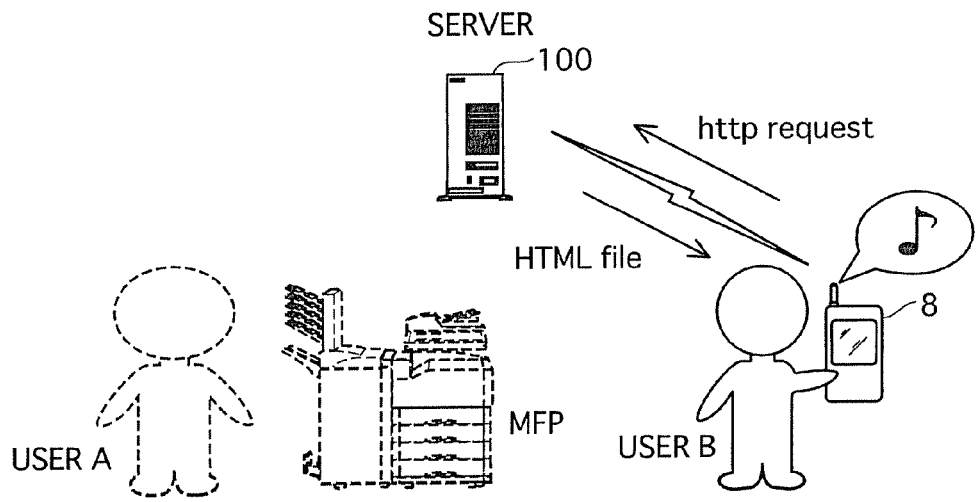
FIG. 6A and FIG. 6B are time-series conceptual drawings showing a specific example case.
Figure 6B:
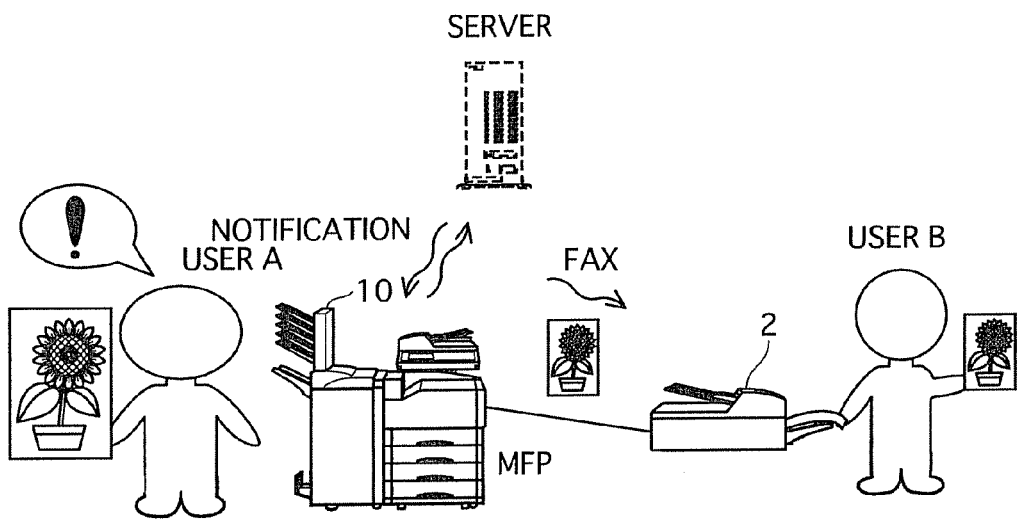

FIG. 6A and FIG. 6B are time-series conceptual drawings showing a specific example case;

(1) At 14:05, the user B registers a recipient's configuration (FAX: 0120-345-XXXX) in the server 100, via the web browser of the portable terminal apparatus 8 [FIG. 6A].

(2) At 14:10, the user A logs in to the MFP 10, and is notified of that the user B has newly registered a recipient's configuration. Then, the user A scans a document, and transmits the scan data to the user B in accordance with the newly registered recipient's configuration.

FIG. 7 is a flowchart parallely showing processing performed by the server 100 and processing performed by the controller 20 of the MFP 10.

Firstly, the server 100 receives an instruction to start registration of a recipient's configuration (S11), and displays a registration menu accordingly (S12).

This instruction is, for example, an HTTP request from the web browser of the portable terminal apparatus 8. The server 100 displays the registration menu by returning a HTML file to the web browser.

Figure 8:
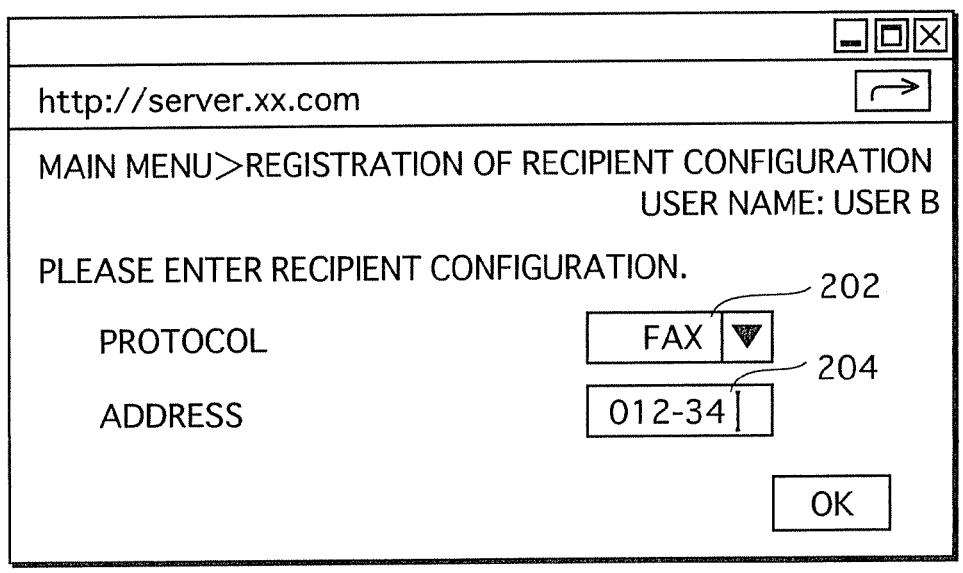
FIG. 8 shows a registration menu window displayed by a web browser of a portable terminal apparatus 8.

FIG. 8 shows the registration menu window displayed by the web browser of the portable terminal apparatus 8.

The registration menu window 200 shows therein a message "Please input a recipient's configuration", a spin box 202 for selection of a protocol (selectable options are FAX, Email, FTP, SMB and WebDAV), and an input box 204 for an address.

Again, as FIG. 7 shows, the server 100 accepts a registration via the registration menu window 200 (S13). If the registration is a new registration (S14), and if there is a per-user address book in which the user who attempts to make the new registration is already registered, the server 100 sets a notification flag to the per-use address book (S15). It is highly possible that a sender, who attempts to send image data or the like to the recipient who has newly registered the configuration, uses the recipient's configuration. Therefore, the operations described above are performed for only notifying the sender of the recipient who has newly registered the configuration so that the notification is effective.

The user B is already registered in the user A's address book (see FIG. 4: the table 115a). Accordingly, when the user B registers the recipient's configuration, a notification flag is set to the user A's address book to show that the user B has newly registered the configuration.

Meanwhile, for example, the user F is not registered in the user A's address book. Accordingly, even when the user F registers the recipient's configuration, the notification flag is not to be set to the user A's address book.

Next, when the MFP 10 accepts the login (S21: YES), the MFP 10 refers to the address book of the login user in order to check whether a notification flag is set to the address book (S22).

If there is a notification flag (S22: YES), the MFP 10 displays the notification on the panel 56 (S23). Here, the MFP 10 may not repeatedly display the notification flag that has been displayed by resetting the notification flag. Alternatively, it is possible to determine the upper limit of the number of the notifications or the period for the notification by associating the already-notified flag with the login user.

Figure 9:
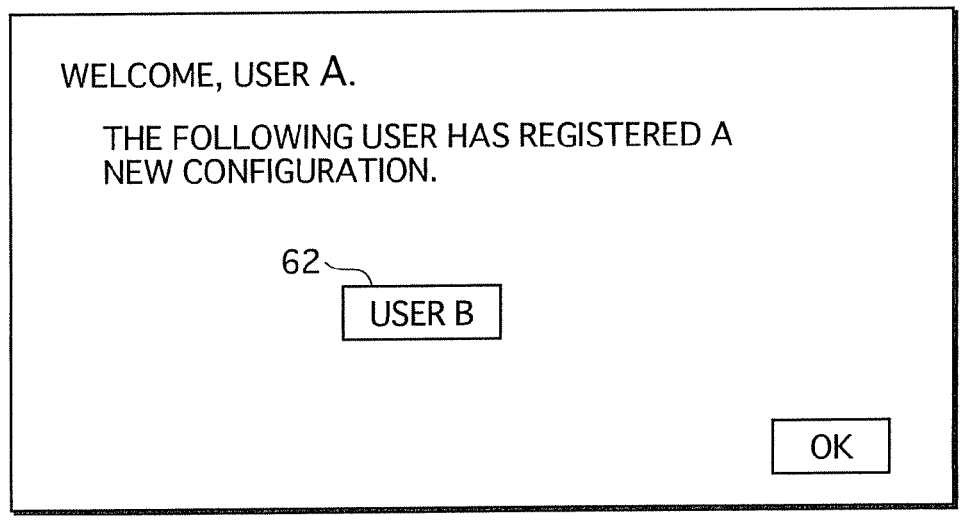
FIG. 9 shows a screen 60 displayed on a panel 56, where the screen 60 is showing a notification message.

FIG. 9 corresponds to the step S23, and shows a screen 60 displayed on a panel 56. In FIG. 9, the screen 60 is showing a notification message.

FIG. 9 is a success screen showing that a user has successfully logged in (This is displayed immediately after the user logs in, and also called as a "welcome screen").

A message "Welcome user A" is displayed on the top of the screen 60, and another message, showing that the user B has registered a recipient's configuration, is displayed below the welcome message.

A "User B" key 62 is selectable by touching it. When the MFP receives a selection of the key 62, the panel screen changes to a menu screen 70 for determining whether to use a recipient's configuration. The menu screen 70 is shown in FIG. 10.

The menu screen 70 shows a message that asks the user A whether to use the recipient's configuration of the user B. The user A can determine whether to use it by selecting a "YES" key 72 or a "NO" key 74.

As described above, according to the first embodiment, if the user B registers a recipient's configuration in the recipient-configuration address book 116, the user A, who has registered the user B in his own address book 114a before, is notified of that the user B has been newly registered the recipient's configuration. With this structure, it is possible to prompt the user A to use the recipient's configuration.

In particular, in the case of FIG. 6B, the user A who has received the notification can send data to the user B via FAX (0120-345-xxxx) instead of sending it via SMB (e.g. "PC-b"). The user B who has made a registration for receiving data via FAX can receive data in a desired mode.

Note that although the notification of a new registration is explained above, the present invention is not limited to this. The sender may be notified in the same manner when a registered mode is changed, or when a registration is deleted.

Second Embodiment

In the first embodiment, the server 100 judges whether to provide the notification. In the second embodiment, however, the MFP 10 makes this judgment. The functional structures of the MFP 10 and the server 100 are the same as those of the first embodiment. Therefore, only the differences are described next.

Figure 11:
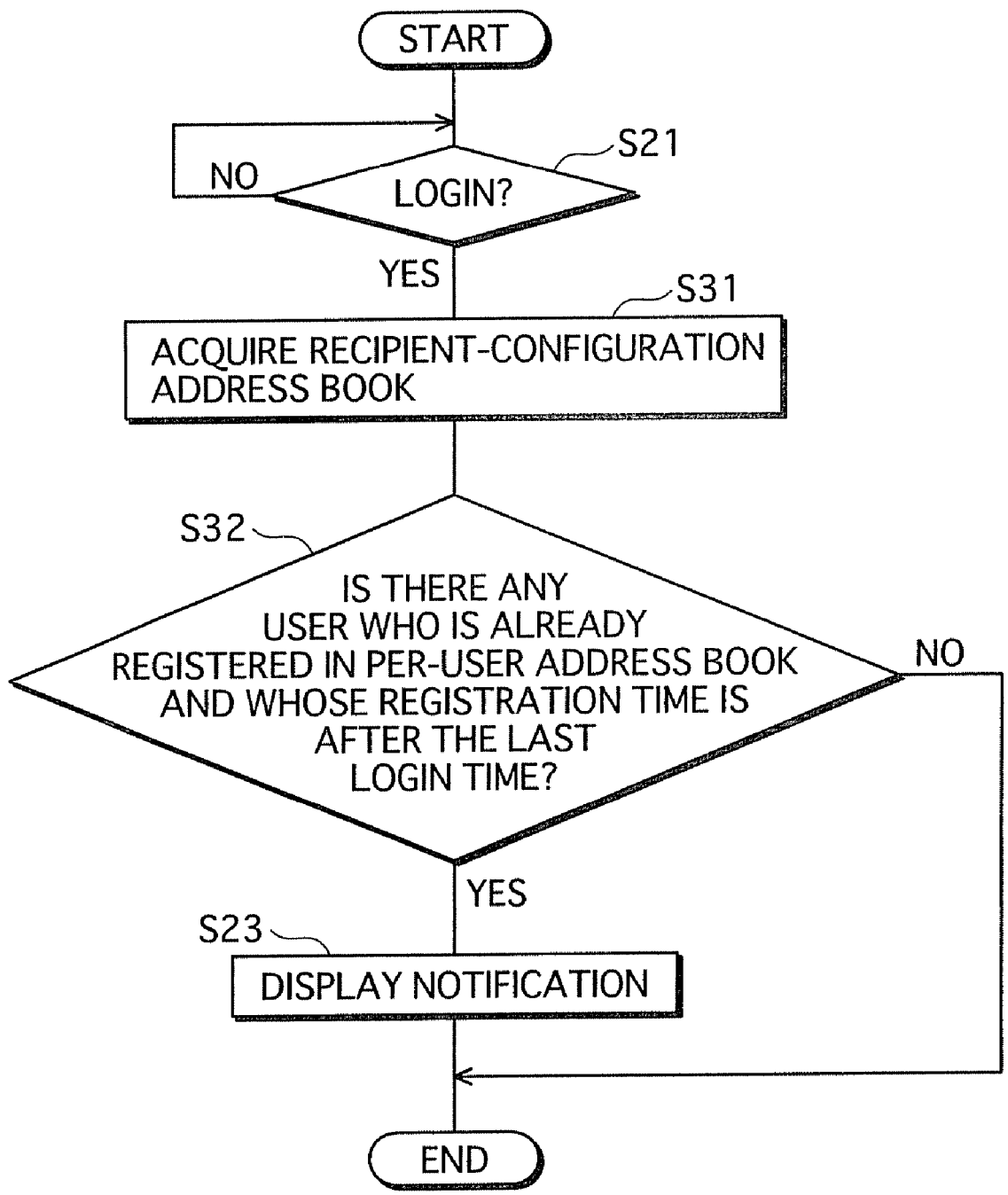
FIG. 11 is a flowchart showing processing performed by a controller 20 of the MFP 10.

FIG. 11 is a flowchart showing processing performed by the controller 20 of the MFP 10. The same numbers are given to the steps that are also included in FIG. 7.

When the MFP 10 accepts the login (S21: YES), the MFP 10 acquires the recipient-configuration address book 116 from the server 100 (S31), and refers to registration times (see FIG. 5) described in the recipient-configuration address book 116 to check whether or not there is any user who is already registered in the per-user address book of the login user and whose registration time is after the last login time of the login user (S32).

For example, if the previous login time of the user A is "6/20 12:00", and the current login time of the user A is "6/26 14:10", the MFP 10 notifies the user A of the registration of a user who registered a recipient's configuration between "6/20 12:00" and "6/26 14:10" (In the example of FIG. 5, the registration time of the user B is "6/26 14:05". Accordingly, the user A is to be notified of the user B's registration).

Note that although the notification of a new registration is explained above, the present invention is not limited to this. The sender may be notified in the same manner when a registered mode is changed, or when a registration is deleted.

Other Modifications (1) Although not mentioned in the embodiments above, addresses may be manually registered in the per-user address book by the users, or automatically registered by using addresses in the users' transmission histories.

For example, if the user A has a transmission history showing that the user A sent data to a user X in the past, it is effective to notify the user A of that the user X has newly made a registration. This is because it is highly possible that the user A uses the configuration registered by the user X.

(2) In the embodiments above, the notification is provided by displaying a screen. However, the notification may be provided by giving an audio warning.

(3) In the embodiments above, the notification is provided when a user who has newly registered has a user name that is the same as a user name that is already registered in the per-user address book of the login user. However, it is unnecessary that the names are completely the same.

For example, assume a case where there is a group A to which a user Y and a user Z belong, and the user Y is registered in a user X's per-user address book but the user Z is not. In this case, when the user Z newly registers a configuration, the user X may be notified of this registration. This is because there is a possibility that the user X, whose address book includes the user Y, uses the recipient's configuration registered by the user Z who also belongs to the group A.

(4) The image transmission system pertaining to the embodiments above may be applied as a method for providing a notification of a new registration of a recipient-configuration address, and a program realizing the method.

The program may be recorded on varieties of recording media from which data can be read with use of a computer. Such recording media include: a magnetic tape, a magnetic disc such as a flexible disc, optical discs such as a DVD, a CD-ROM, a CD-R, an MO, and a PD, and flash memory type recording media such as a Smart Media (registered trademark). The program may be produced and transferred, in the form of the aforementioned recording media. Alternatively, the program maybe transmitted and supplied, in the form of the program itself, via a variety of wired/wireless network including the Internet, a broadcast, an electric communication circuit, and satellite communication.

Furthermore, it is not necessary that the program of the present invention includes all the modules for making a computer execute the aforementioned operations. For example, varieties of general programs individually installable to an information processing apparatus may be used to make a computer execute each operation of the present invention. The general programs include such as a communication program, and a program included in the operating system (OS). This means that the recording medium of the present invention does not have to contain all the aforementioned modules, nor transmit all the aforementioned modules. Still Further, a predetermined operation may be sometimes executed using dedicated hardware.

Summary of Embodiments (1) An aspect of the present invention is an image transmission system that includes a server and an image transmission apparatus as a client which are connectable to each other, the server comprising: an accepting part operable to accept registration, from a recipient, of an identifier and an address thereof; a first storage operable to store therein the identifier and the address of the recipient in a form of a recipient-address book; a second storage operable to store therein per-sender address books that each belongs to one of senders and includes identifiers and addresses of destinations; and a setting part operable to compare the identifier of the recipient with the identifiers of the destinations included in the per-sender address books, and if any of the per-sender address books include an identifier of a destination that is related to the identifier of the recipient, associate the identifier of the recipient with the any of the per-sender address books, and set a notification flag to the any of the per-sender address books to show that the registration from the recipient has been accepted, and the image transmission apparatus comprising: a login part operable to accept a login of a sender; an acquisition part operable to acquire, from the server, one of the per-sender address books that corresponds to the sender; and a notification part operable to notify the sender, of the identifier of the recipient if the notification flag has been set to the acquired per-sender address book.

(2) In the structure of (1), after accepting the login, the login part may display a success screen that shows success of the login, and the notification part may display the identifier of the recipient within the success screen to notify the sender.

With the stated structure, for example, it is possible to provide the login user with a visual notification by displaying a notification on a success screen that is displayed immediately after the login user performs operations for logging in.

(3) In the structure of (1), the image transmission apparatus may further comprise a menu display part operable to display a selection menu that allows the sender to select whether to use registration content that corresponds to the identifier of the recipient.

With the stated structure, it is possible to more effectively promote use of the recipient's configuration by displaying the menu for allowing the sender to determine whether to use the recipient's configuration.

(4) In the structure of (3), the accepting part may further accept registration, from the recipient, of protocol information that shows a communications protocol corresponding to the address of the recipient, the first storage may further store therein the protocol information together with the identifier and the address of the recipient in a form of the recipient-address book, and the menu display part may display the communications protocol within the selection menu.

The transmission cost and the image format of image data might depend on the protocol used for transmission of the image data. For example, the transmission cost of G3FAXs is higher than that of Emails, and resolutions defined in specifications of G3FAXs and G4FAXs are different.

Also, since the protocol included in the recipient's configuration has not been configured by the sender, the sender can not get the full picture of the configuration, in some cases.

With the stated structure, it is possible to previously notify the login user of the communications protocol relating to the recipient's configuration. Therefore, it is possible to realize a user interface design that gives a feeling of security to the sender.

(5) In the structure of (4), the image transmission apparatus may further comprise: a selection receiving part operable to receive a selection by the sender input from the selection menu; and a transmitting part operable, if the selection shows that the sender has selected to use the registration content, to transmit image data using the communications protocol included in the recipient-address book.

With the stated structure, in addition to the advantageous effect of (4) above, it is possible to allow the login user to determine whether to use the communications protocol relating to the recipient's configuration.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. An image transmission system that includes a server and an image transmission apparatus as a client which are connectable to each other, the server comprising:
a first electronic storage configured to store therein a recipient-configuration address book containing an identifier and an address of a user registered by the user, the address being a destination of image data for the user where the user wishes to receive the image data, wherein the address of the user in the recipient-configuration address book contains protocol information that shows a communication protocol corresponding to the address of the user;
a second electronic storage configured to store therein per-sender address books each registered by a different one of senders of image data and including identifiers and addresses of destinations registered for the corresponding one of the senders;
an accepting part configured to accept registration of a user into the recipient-configuration address book;
a judging part configured to, when the accepting part accepts the registration, judge whether the user whose registration has been accepted in the recipient-configuration address book has been registered as a destination in any of the per-sender address books in the second electronic storage; and
a setting part configured to, when the judging part judges affirmatively, set a notification flag for each per-sender address book for which the judging part judges affirmatively to show that the user has been registered in the recipient-configuration address book, and, when the judging part judges negatively, not to set the notification flag for each per-sender address book for which the judging part judges negatively; and the image transmission apparatus comprising:
a login part configured to accept a login of a sender;
an acquisition part configured to acquire, from the server, one of the per-sender address books that corresponds to the sender;
a notification part configured to notify the sender, of the identifier of the user registered in the recipient-configuration address book if the notification flag has been set to the acquired per-sender address book; and
a transmitting part configured to, when a use of a registration content is allowed, transmit the image data to the address of the user registered in the recipient-configuration address book based on the protocol information contained in the address, and when the use of the registration content is not allowed, transmit the image data to the address of the user based on a communication protocol designated in the per-sender address book corresponding to the sender.

2. The image transmission system of claim 1, wherein
after accepting the login, the login part displays a success screen that shows success of the login, and
the notification part displays the identifier of the registered user within the success screen to notify the sender.

3. The image transmission system of claim 1, wherein
the image transmission apparatus further comprises
a menu display part operable to display a selection menu that allows the sender to select whether to use registration content that corresponds to the identifier of the user registered in the recipient-configuration address book.

4. The image transmission system of claim 3, wherein
the menu display part displays the communications protocol within the selection menu.

5. An image transmission system that includes a server and an image transmission apparatus as a client which are connectable to each other,
the server comprising:
a first electronic storage configured to store therein a recipient-configuration address book containing an identifier and an address of a user registered by the user, the address being a destination of image data for the user where the user wishes to receive the image data, wherein the address of the user in the recipient-configuration address book contains protocol information that shows a communication protocol corresponding to the address of the user;
a second electronic storage configured to store therein per-sender address books each registered by a different one of senders of image data and including identifiers and address of destinations registered for the corresponding one of the senders;
an accepting part configured to accept registration of a user into the recipient-configuration address book; and the image transmission apparatus comprising:
a login part configured to accept a login of a sender;
a first acquisition part configured to acquire, from the server, one of the per-sender address books that corresponds to the sender;
a second acquisition part configured to acquire the recipient-configuration address book;
a search part configured to search within the acquired per-sender address book, a user that has been newly registered in the recipient-configuration address book, based on the acquired recipient-configuration address book;
a notification part configured to notify the sender of the identifier of the user found by the search; and
a transmitting part configured to, when a use of a registration content is allowed, transmit the image data to the address of the user registered in the recipient-configuration address book based on the protocol information contained in the address, and when the use of the registration content is not allowed, transmit the image data to the address of the user based on a communication protocol designated in the per-sender address book corresponding to the sender.

6. The image transmission system of claim 5, wherein
after accepting the login, the login part displays a success screen that shows success of the login, and
the notification part displays the identifier of the registered user within the success screen to notify the sender.

7. The image transmission system of claim 5, wherein
the image transmission apparatus further comprises
a menu display part operable to display a selection menu that allows the sender to select whether to use registration content that corresponds to the identifier of the user registered in the recipient-configuration address book.

8. The image transmission system of claim 7, wherein
the menu display part displays the communications protocol within the selection menu.

9. The image transmission system of claim 1, wherein the registration of the user accepted into the recipient-configuration address book includes a new address of the user different from the address of the user contained in the recipient-configuration address book.

10. The image transmission system of claim 5, wherein the registration of the user accepted into the recipient-configuration address book includes a new address of the user different from the address of the user contained in the recipient-configuration address book.

* * * * *